US010334271B2

(12) United States Patent
Bae et al.

(10) Patent No.: US 10,334,271 B2
(45) Date of Patent: Jun. 25, 2019

(54) ENCODING SYSTEM USING MOTION ESTIMATION AND ENCODING METHOD USING MOTION ESTIMATION

(71) Applicant: SK PLANET CO., LTD., Gyeonggi-do (KR)

(72) Inventors: Tae Meon Bae, Daegu (KR); Joong Yun Lee, Seoul (KR); Kyung Min Kim, Seoul (KR); Byung Seok Hwang, Gyeonggi-do (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 14/948,075

(22) Filed: Nov. 20, 2015

(65) Prior Publication Data

US 2016/0080764 A1 Mar. 17, 2016

Related U.S. Application Data

(63) Continuation of application No. 12/737,827, filed as application No. PCT/KR2008/006658 on Nov. 12, 2008.

(30) Foreign Application Priority Data

Mar. 7, 2008 (KR) .......................... 10-2008-0021543

(51) Int. Cl.
*H04N 19/543* (2014.01)
*H04N 19/124* (2014.01)
(Continued)

(52) U.S. Cl.
CPC ......... *H04N 19/543* (2014.11); *H04N 19/103* (2014.11); *H04N 19/124* (2014.11);
(Continued)

(58) Field of Classification Search
CPC ........ H04N 19/00; H04N 19/20; H04N 19/61; H04N 19/98; H04N 19/103; H04N 19/136;
(Continued)

(56) References Cited

U.S. PATENT DOCUMENTS 5,485,279 A * 1/1996 Yonemitsu ........... H04N 19/577
375/240.02
5,510,857 A 4/1996 Kopet et al.
(Continued)

FOREIGN PATENT DOCUMENTS

EP 0594936 5/1994
JP 2007-251865 9/2007
(Continued)

OTHER PUBLICATIONS

United States Office Action, U.S. Appl. No. 14/948,053, dated Jul. 27, 2017, 17 pages.
(Continued)

*Primary Examiner* — Dave Czekaj
*Assistant Examiner* — Kehinde Abimbola
(74) *Attorney, Agent, or Firm* — Fenwick & West LLP

(57) ABSTRACT

Provided are an encoding system using motion estimation and an encoding method using motion estimation for achieving high-speed motion estimation according to a multi-processing unit. The encoding system using motion estimation, comprises a multi-processing unit calculating motion estimation on many macroblocks of an input image, a motion estimator estimating motion vectors of the macroblocks of the input image using the motion estimation on the plurality of macroblocks, previously calculated by the multi-processing unit, and an encoder encoding the image based on the motion vectors of the macroblocks, estimated by the motion estimator. According to the present invention,
(Continued)

motion estimation to be used for motion estimation can be calculated in advance according to the multi-processing unit capable of processing high-speed parallel processing to reduce an image encoding time and improve an encoding speed.

6 Claims, 5 Drawing Sheets

(51) Int. Cl.
| | | |
|---|---|---|
| H04N 19/176 | (2014.01) | |
| H04N 19/517 | (2014.01) | |
| H04N 19/593 | (2014.01) | |
| H04N 19/61 | (2014.01) | |
| H04N 19/147 | (2014.01) | |
| H04N 19/433 | (2014.01) | |
| H04N 19/436 | (2014.01) | |
| H04N 19/103 | (2014.01) | |
| H04N 19/172 | (2014.01) | |

(52) U.S. Cl.
CPC ......... *H04N 19/147* (2014.11); *H04N 19/172* (2014.11); *H04N 19/176* (2014.11); *H04N 19/433* (2014.11); *H04N 19/436* (2014.11); *H04N 19/517* (2014.11); *H04N 19/593* (2014.11); *H04N 19/61* (2014.11)

(58) Field of Classification Search
CPC .... H04N 19/157; H04N 19/176; H04N 19/70; H04N 19/52; H04N 19/174; H04N 19/513; H04N 19/105; H04N 19/184; H04N 19/172; H04N 19/139; H04N 19/159; H04N 19/197; H04N 19/463; H04N 19/573; H04N 19/436; H04N 19/124; H04N 19/593; H04N 19/147; H04N 19/433; H04N 19/517; H04N 19/543; H04N 19/156; H04N 19/186; H04N 19/44; H04N 19/11; H04N 19/1887; H04N 19/597; G06T 9/40
See application file for complete search history.

(56) References Cited

U.S. PATENT DOCUMENTS

| | | | |
|---|---|---|---|
| 5,559,931 A | 9/1996 | Shindou et al. | |
| 5,739,862 A | 4/1998 | Cen | |
| 5,825,421 A * | 10/1998 | Tan ...................... | H04N 19/577 348/699 |
| 5,946,405 A | 8/1999 | Kim et al. | |
| 5,963,673 A | 10/1999 | Kodama et al. | |
| 6,157,676 A * | 12/2000 | Takaoka ............... | H04N 19/593 348/409.1 |
| 6,363,119 B1 | 3/2002 | Oami | |
| 6,381,275 B1 | 4/2002 | Fukuhara et al. | |
| 6,408,029 B1 | 6/2002 | McVeigh | |
| 6,489,995 B1 | 12/2002 | Kok | |
| 6,574,278 B1 | 6/2003 | McVeigh | |
| 6,584,226 B1 * | 6/2003 | Chaddha ................. | G06T 9/008 348/669 |
| 6,600,785 B1 | 7/2003 | Nishigori et al. | |
| 6,639,945 B2 * | 10/2003 | Chaddha ................ | H04N 19/51 375/240.23 |
| 6,909,749 B2 | 6/2005 | Yang et al. | |
| 7,046,734 B2 | 5/2006 | McVeigh | |
| 7,215,384 B2 | 5/2007 | McVeigh | |
| 7,263,127 B1 | 8/2007 | McVeigh | |
| 7,292,772 B2 | 11/2007 | Ueda | |
| RE40,080 E * | 2/2008 | Tan ............... | 348/699 |
| 7,453,940 B2 | 11/2008 | Gallant et al. | |
| 7,567,617 B2 | 7/2009 | Holcomb | |
| 7,620,107 B2 | 11/2009 | Lee et al. | |
| 7,643,690 B2 | 1/2010 | Suzuki et al. | |
| 7,782,938 B2 | 8/2010 | Pearlstein | |
| 7,813,570 B2 | 10/2010 | Shen et al. | |
| 7,843,993 B2 | 11/2010 | Park | |
| 7,848,423 B2 | 12/2010 | Chujoh et al. | |
| 7,924,925 B2 | 4/2011 | He | |
| 7,933,331 B2 | 4/2011 | Gallant et al. | |
| 7,961,789 B2 | 6/2011 | Hwang | |
| 8,009,174 B2 | 8/2011 | Beric et al. | |
| 8,170,102 B2 | 5/2012 | Bhaskaran et al. | |
| 8,208,549 B2 | 6/2012 | Sasai et al. | |
| 8,311,120 B2 | 11/2012 | Kaushik | |
| 8,472,529 B2 | 6/2013 | He et al. | |
| 8,625,669 B2 | 1/2014 | Holcomb | |
| 8,644,387 B2 | 2/2014 | Chung | |
| 8,654,844 B1 | 2/2014 | Hoang | |
| 8,670,653 B2 | 3/2014 | Shibata et al. | |
| 8,675,739 B2 * | 3/2014 | Baik ...................... | G06F 9/5088 375/240.25 |
| 8,687,694 B2 * | 4/2014 | Wahadaniah .......... | H04N 19/51 375/240.15 |
| 8,737,479 B2 | 5/2014 | Kumar et al. | |
| 8,761,258 B2 | 6/2014 | Au et al. | |
| 8,761,259 B2 | 6/2014 | Wang | |
| 8,774,272 B1 | 7/2014 | Chen | |
| 8,958,476 B2 | 2/2015 | Kim et al. | |
| 2001/0053183 A1 | 12/2001 | McVeigh | |
| 2002/0009144 A1 * | 1/2002 | Ishihara ................. | H04N 5/145 375/240.16 |
| 2002/0009287 A1 | 1/2002 | Ueda | |
| 2002/0106019 A1 * | 8/2002 | Chaddha ................ | H04N 19/51 375/240.02 |
| 2003/0059122 A1 | 3/2003 | Boon | |
| 2003/0118117 A1 | 6/2003 | McVeigh | |
| 2003/0154687 A1 | 8/2003 | Sugahara et al. | |
| 2004/0001544 A1 | 1/2004 | Mehrotra | |
| 2004/0008778 A1 | 1/2004 | Yang et al. | |
| 2004/0008786 A1 | 1/2004 | Boyce | |
| 2004/0022319 A1 | 2/2004 | Pearlstein | |
| 2004/0228401 A1 | 11/2004 | Chen | |
| 2004/0234143 A1 | 11/2004 | Hagai et al. | |
| 2004/0247029 A1 | 12/2004 | Zhong et al. | |
| 2004/0258155 A1 | 12/2004 | Lainema et al. | |
| 2005/0013363 A1 | 1/2005 | Cho et al. | |
| 2005/0013368 A1 | 1/2005 | Gallant et al. | |
| 2005/0013369 A1 | 1/2005 | Lee | |
| 2005/0018646 A1 | 1/2005 | Sriram et al. | |
| 2005/0025240 A1 | 2/2005 | Kuo et al. | |
| 2005/0025371 A1 | 2/2005 | Atsumi et al. | |
| 2005/0053137 A1 | 3/2005 | Holcomb | |
| 2005/0108764 A1 | 5/2005 | Rosenberg et al. | |
| 2005/0201463 A1 | 9/2005 | Lee | |
| 2005/0243921 A1 | 11/2005 | Au et al. | |
| 2005/0281332 A1 | 12/2005 | Lai et al. | |
| 2006/0002474 A1 | 1/2006 | Au et al. | |
| 2006/0044576 A1 | 3/2006 | Tabata et al. | |
| 2006/0056513 A1 | 3/2006 | Shen et al. | |
| 2006/0088097 A1 | 4/2006 | Park | |
| 2006/0126728 A1 | 6/2006 | Yu et al. | |
| 2006/0126952 A1 | 6/2006 | Suzuki et al. | |
| 2006/0140271 A1 | 6/2006 | Wedi et al. | |
| 2006/0153287 A1 | 7/2006 | Shen | |
| 2006/0227868 A1 | 10/2006 | Chen et al. | |
| 2006/0227873 A1 | 10/2006 | Toebes et al. | |
| 2006/0233251 A1 | 10/2006 | Kim et al. | |
| 2006/0233525 A1 | 10/2006 | Shibata et al. | |
| 2007/0098064 A1 | 5/2007 | Au et al. | |
| 2007/0110160 A1 | 5/2007 | Wang et al. | |
| 2007/0127572 A1 | 6/2007 | Sasai et al. | |
| 2007/0140338 A1 | 6/2007 | Bhaskaran et al. | |
| 2007/0154103 A1 | 7/2007 | Au et al. | |
| 2007/0201559 A1 | 8/2007 | He | |
| 2007/0230572 A1 | 10/2007 | Koto et al. | |
| 2007/0237221 A1 | 10/2007 | Hsu et al. | |
| 2007/0268964 A1 | 11/2007 | Zhao | |
| 2007/0286277 A1 * | 12/2007 | Chen ...................... | H04N 19/52 375/240.03 |
| 2008/0002769 A1 | 1/2008 | Matsui | |

(56) References Cited

U.S. PATENT DOCUMENTS

| | | |
|---|---|---|
| 2008/0008238 A1 | 1/2008 | Song |
| 2008/0008250 A1 | 1/2008 | Mori et al. |
| 2008/0031340 A1 | 2/2008 | Hong |
| 2008/0043831 A1 | 2/2008 | Sethuraman |
| 2008/0049837 A1 | 2/2008 | Tanaka et al. |
| 2008/0117975 A1 | 5/2008 | Sasai et al. |
| 2008/0123974 A1 | 5/2008 | Zhu |
| 2008/0125104 A1 | 5/2008 | You et al. |
| 2008/0126278 A1 | 5/2008 | Bronstein |
| 2008/0152000 A1 | 6/2008 | Kaushik |
| 2008/0152014 A1 | 6/2008 | Schreier et al. |
| 2008/0170616 A1 | 7/2008 | Hwang |
| 2008/0192827 A1* | 8/2008 | Beric ............ H04N 5/145 375/240.16 |
| 2008/0204602 A1* | 8/2008 | Beric ............ H04N 19/56 348/699 |
| 2008/0205508 A1 | 8/2008 | Ziauddin et al. |
| 2008/0215644 A1 | 9/2008 | Beric et al. |
| 2008/0240242 A1 | 10/2008 | Lainema |
| 2008/0246884 A1 | 10/2008 | Chung |
| 2008/0260043 A1 | 10/2008 | Bottreau et al. |
| 2008/0260270 A1 | 10/2008 | Lainema |
| 2009/0002379 A1 | 1/2009 | Baeza et al. |
| 2009/0003443 A1 | 1/2009 | Guo et al. |
| 2009/0010336 A1 | 1/2009 | Au et al. |
| 2009/0016626 A1 | 1/2009 | Zhang et al. |
| 2009/0022223 A1 | 1/2009 | Gallant et al. |
| 2009/0046776 A1 | 2/2009 | Au et al. |
| 2009/0074080 A1 | 3/2009 | He et al. |
| 2009/0103617 A1 | 4/2009 | Au et al. |
| 2009/0123082 A1 | 5/2009 | Atanssov et al. |
| 2009/0125538 A1 | 5/2009 | Rosenzweig |
| 2009/0154572 A1* | 6/2009 | Baik ............ G06F 9/5088 375/240.25 |
| 2009/0168890 A1 | 7/2009 | Holcomb |
| 2010/0020877 A1 | 1/2010 | Au et al. |
| 2010/0067581 A1 | 3/2010 | Hong et al. |
| 2010/0150240 A1* | 6/2010 | Wahadaniah ........ H04N 19/51 375/240.15 |
| 2010/0215106 A1 | 8/2010 | Au et al. |
| 2011/0293016 A1 | 12/2011 | Suzuki et al. |
| 2011/0293017 A1 | 12/2011 | Suzuki et al. |
| 2011/0299600 A1 | 12/2011 | Suzuki et al. |
| 2012/0155541 A1 | 6/2012 | Kumar et al. |
| 2012/0163447 A1 | 6/2012 | Mehrotra et al. |
| 2012/0281763 A1 | 11/2012 | Suzuki et al. |
| 2013/0230099 A1 | 9/2013 | DeForest et al. |
| 2014/0098876 A1 | 4/2014 | Jeon |
| 2014/0161178 A1* | 6/2014 | Young ............ H04N 19/176 375/240.03 |
| 2014/0334548 A1* | 11/2014 | Chen ............ H04N 19/52 375/240.16 |
| 2015/0124868 A1 | 5/2015 | Kim et al. |
| 2015/0124874 A1 | 5/2015 | Pace et al. |
| 2015/0195556 A1 | 7/2015 | Kim et al. |
| 2015/0229923 A1 | 8/2015 | Kim et al. |
| 2015/0271501 A1 | 9/2015 | Kim et al. |

FOREIGN PATENT DOCUMENTS

| | | |
|---|---|---|
| KR | 10-2005-0078153 | 8/2005 |
| KR | 10-2007-0036285 | 4/2007 |

OTHER PUBLICATIONS

United States Office Action, U.S. Appl. No. 14/948,053, dated Sep. 9, 2016, 14 pages.
United States Office Action, U.S. Appl. No. 14/948,053, dated Mar. 25, 2016, 12 pages.
United States Advisory Action, U.S. Appl. No. 14/948,053, dated Nov. 30, 2016, 3 pages.
United States Office Action, U.S. Appl. No. 14/948,063, dated Apr. 28, 2017, 16 pages.
United States Office Action, U.S. Appl. No. 14/948,063, dated Sep. 14, 2016, 13 pages.
United States Office Action, U.S. Appl. No. 14/948,063, dated Nov. 15, 2017, 16 pages.
United States Advisory Action, U.S. Appl. No. 14/948,071, dated May 19, 2017, 3 pages.
United States Office Action, U.S. Appl. No. 14/948,071, dated Feb. 13, 2017, 14 pages.
United States Office Action, U.S. Appl. No. 14/948,071, dated Jul. 21, 2016, 15 pages.
United States Office Action, U.S. Appl. No. 14/948,077, dated Nov. 4, 2016, 21 pages.
United States Office Action, U.S. Appl. No. 14/948,077, dated Aug. 2, 2017, 19 pages.
United States Office Action, U.S. Appl. No. 14/948,079, dated Nov. 4, 2016, 17 pages.
United States Office Action, U.S. Appl. No. 14/948,079, dated Aug. 1, 2017, 17 pages.
United States Office Action, U.S. Appl. No. 14/948,086, dated Jun. 28, 2017, 17 pages.
United States Office Action, U.S. Appl. No. 14/948,086, dated Oct. 7, 2016, 16 pages.
United States Office Action, U.S. Appl. No. 14/948,092, dated Jul. 21, 2017, 18 pages.
United States Office Action, U.S. Appl. No. 14/948,092, dated Oct. 24, 2016, 18 pages.
United States Office Action, U.S. Appl. No. 14/948,094, dated Jul. 21, 2017, 16 pages.
United States Office Action, U.S. Appl. No. 14/948,094, dated Oct. 21, 2016, 21 pages.
United States Advisory Action, U.S. Appl. No. 14/948,098, dated May 30, 2017, 3 pages.
United States Office Action, U.S. Appl. No. 14/948,098, dated Feb. 13, 2017, 16 pages.
United States Office Action, U.S. Appl. No. 14/948,098, dated Jul. 21, 2016, 14 pages.
United States Office Action, U.S. Appl. No. 12/737,827, dated Apr. 3, 2017, 11 pages.
United States Office Action, U.S. Appl. No. 12/737,827, dated Aug. 30, 2016, 14 pages.
United States Office Action, U.S. Appl. No. 12/737,827, dated Feb. 22, 2016, 17 pages.
United States Office Action, U.S. Appl. No. 12/737,827, dated Sep. 18, 2014, 15 pages.
United States Office Action, U.S. Appl. No. 12/737,827, dated May 15, 2014, 20 pages.
United States Office Action, U.S. Appl. No. 12/737,827, dated Oct. 25, 2013, 23 pages.
United States Office Action, U.S. Appl. No. 12/737,827, dated May 8, 2013, 19 pages.
United States Advisory Action, U.S. Appl. No. 12/737,827, dated Nov. 30, 2016, 3 pages.
United States Advisory Action, U.S. Appl. No. 12/737,827, dated Dec. 4, 2014, 3 pages.
United States Advisory Action, U.S. Appl. No. 12/737,827, dated Jan. 31, 2014, 3 pages.
United States Office Action, U.S. Appl. No. 12/737,827, dated Nov. 9, 2017, 15 pages.

* cited by examiner

[Fig. 1]
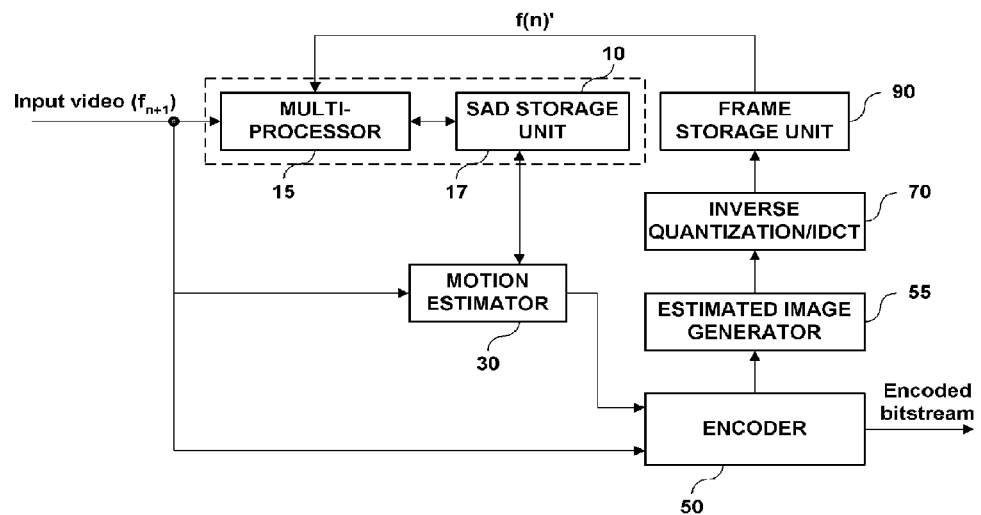
[Fig. 2]
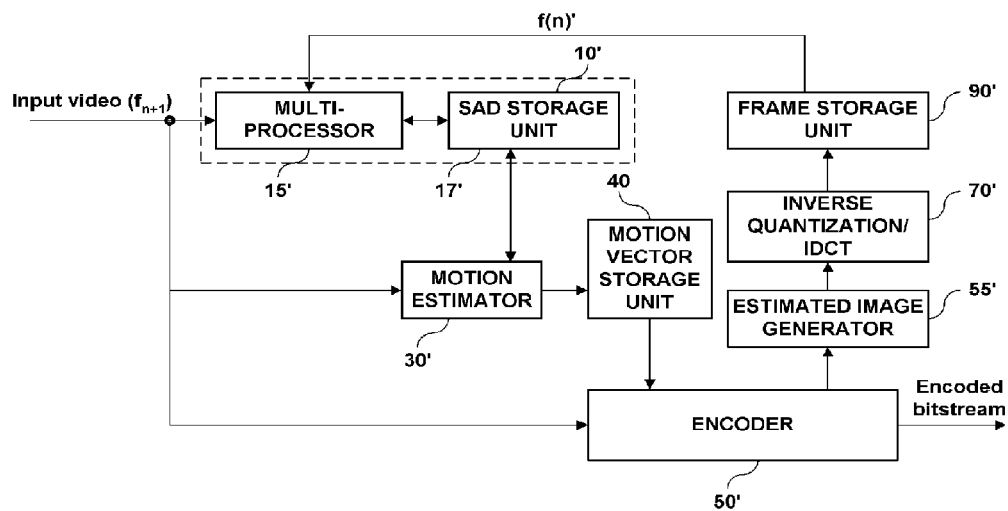

[Fig. 3]
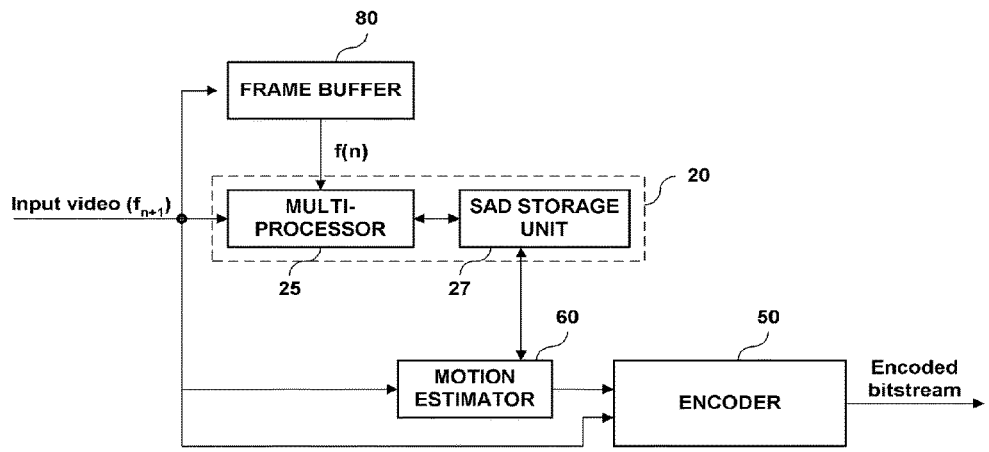
[Fig. 4]
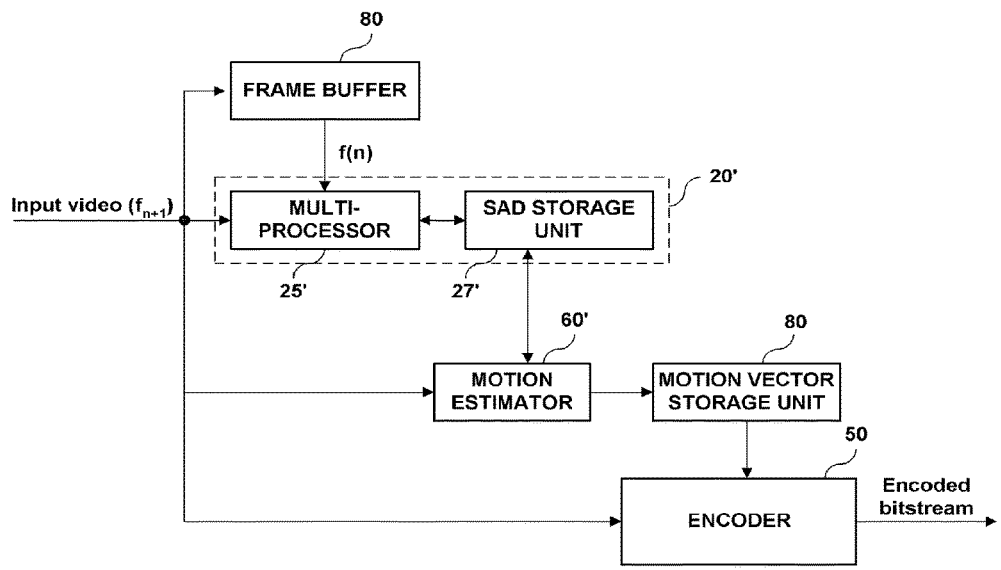

[Fig. 5]
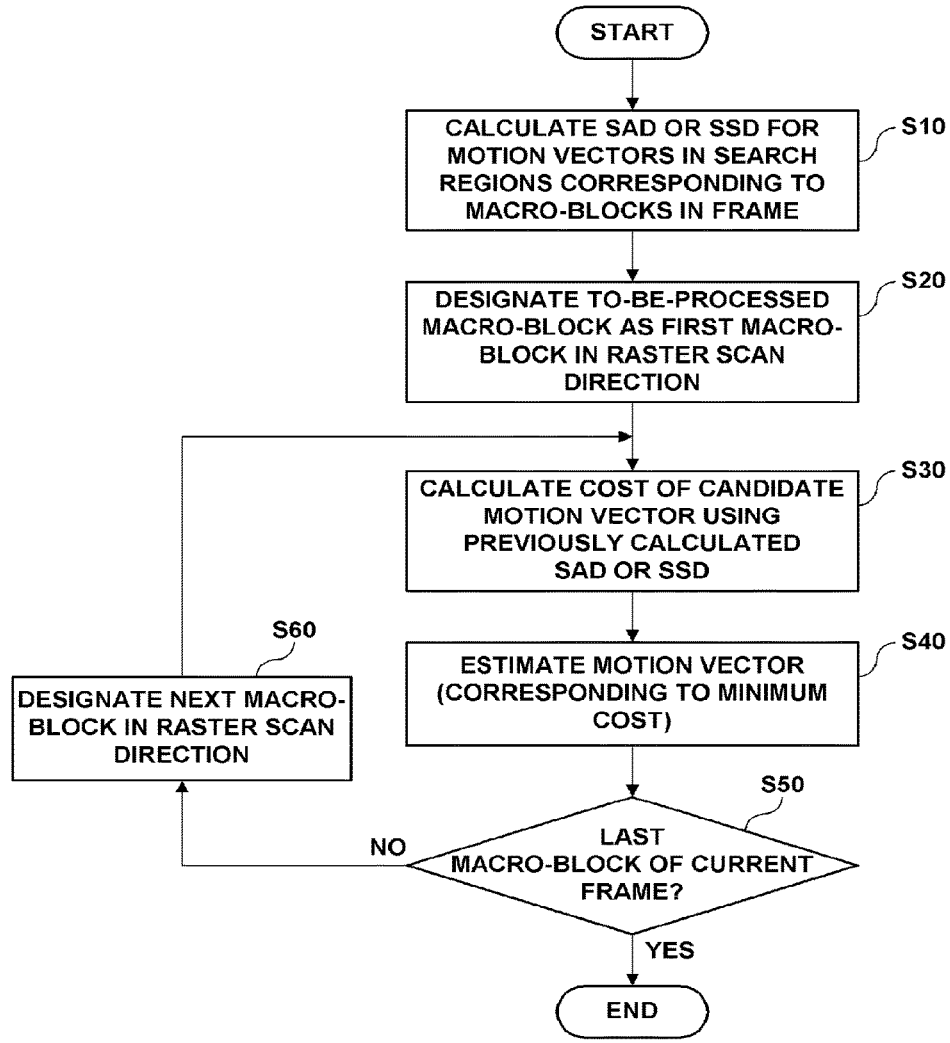

[Fig. 6]
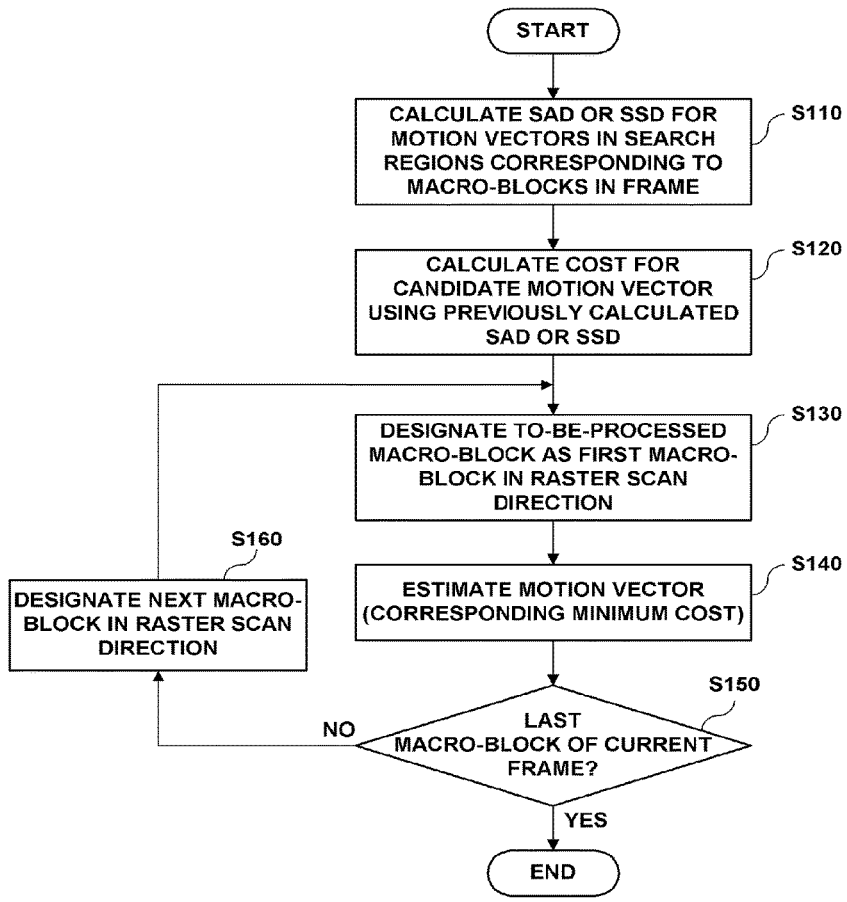
[Fig. 7]
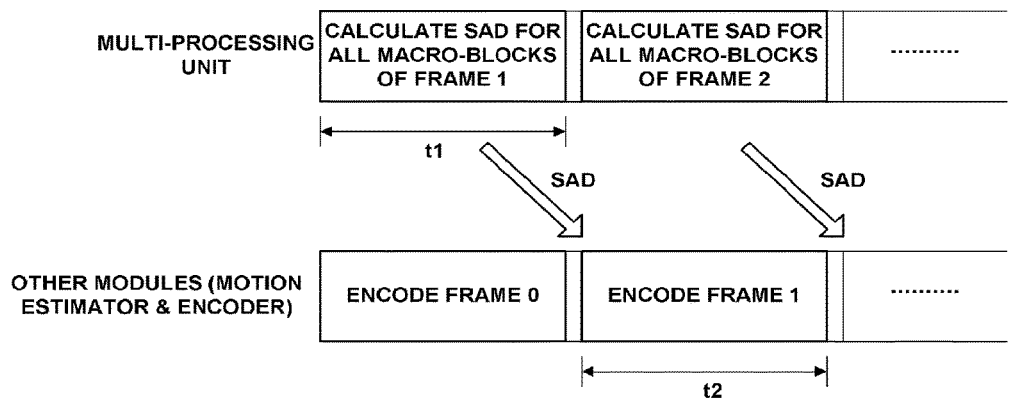

[Fig. 8]
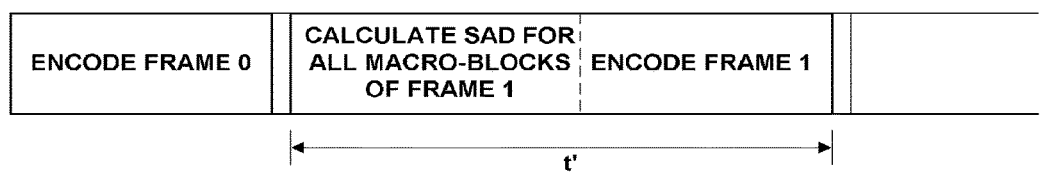

ENCODING SYSTEM USING MOTION ESTIMATION AND ENCODING METHOD USING MOTION ESTIMATION

CROSS-REFERENCE TO RELATED APPLICATIONS

This application is a continuation of U.S. application Ser. No. 12/737,827 filed on Feb. 18, 2011, which is the U.S. national phase of PCT Application No. PCT/KR2008/006658 filed on Nov. 12, 2008, which claims the benefit of Korean Application No. 10-2008-0021543 filed on Mar. 7, 2008, with the Korean Intellectual Property Office, the disclosures of which are incorporated herein by reference.

TECHNICAL FIELD

The present invention relates to an encoding system using motion estimation, and more particularly, to an encoding system using motion estimation and an encoding method using motion estimation for processing operations required for motion estimation according to a multi-processing unit capable of performing high-speed processing to achieve high-speed motion estimation.

BACKGROUND ART

Digitalization and image compression techniques are core elements supporting multimedia. Image compression becomes very important as information is rapidly digitalized.

An MPEG based video encoder removes image repetition in a temporal direction using motion estimation. Particularly, h.264 can obtain a compression rate higher than that of a conventional MPEG video encoder by using an improved motion estimation method such as quarter pel based motion estimation, motion estimation using a variable block, motion estimation using multiple frame referencing, estimation using weights and Lagrange cost based motion estimation. However, the h.264 has to process a large quantity of computations as compared to the conventional MPEG video encoder because the h.264 uses the improved motion estimation method.

A motion estimation algorithm of the h.264 estimates a motion vector Mp of a current macroblock from a motion vector of a previous macroblock, obtains a cost that considers the quantity of data required to encode a difference between the motion vector Mp and an initially estimated motion vector together with a video error in motion estimation through Lagrange multiplier represented by Equation 1 and estimates a candidate motion vector Mv corresponding to a smallest cost as a final motion vector to improve encoding efficiency.

[Equation 1]

$$Cost = SAD + \lambda \times (Mp - Mv) \quad [6]$$

A conventional hardware based motion estimation system supporting the aforementioned motion estimation algorithm performs encoding macroblock by macroblock, encodes a single macroblock, and then processes the next macroblock in a raster scan direction.

The conventional hardware based motion estimation system supporting the motion estimation algorithm has to process the quantity of computations multiple times the quantity of computations processed by conventional MPEG-1,2,4 video encoders to encode a single frame, and thus a relatively long encoding time t is required and most of the encoding time t is consumed for operations for motion estimation.

Recently, a system capable of simultaneously processing a large number of computations in parallel has been developed with the development of hardware. Particularly, graphic hardware based on a graphic process unit (GPU) includes many processing units for processing 3D images in a single system.

Accordingly, the present invention improves the operation processing speed of an h.264 encoder by using many processors capable of simultaneously processing a large number of computations in parallel.

DISCLOSURE OF INVENTION

Technical Problem

Accordingly, the present invention has been made to solve the above-mentioned problems occurring in the conventional art, and a primary object of the present invention is to provide an encoding system capable of achieving high-speed motion estimation, which comprises a multi-processing unit calculating motion estimation on many macroblocks of an input image, a motion estimator estimating motion vectors of the macroblocks of the input image using the motion estimation on the plurality of macroblocks, previously calculated by the multi-processing unit, and an encoder encoding the image based on the motion vectors of the macroblocks, estimated by the motion estimator.

Another object of the present invention is to provide an encoding system using motion estimation, which comprises a frame buffer delaying an input image and outputting the delayed image, a multi-processing unit calculating motion estimation on many macroblocks of a current frame of the input image on the basis of the current frame of the input image and a delayed previous frame from the frame buffer, a motion estimator estimating motion vectors of macroblocks of the image using the motion estimation on the plurality of macroblocks, previously calculated by the multi-processing unit, and an encoder encoding the image based on the motion vectors of the macroblocks, estimated by the motion estimator.

Still another object of the present invention is to provide an encoding method using motion estimation, which comprises the steps of calculating motion estimation on many macroblocks of an input image in advance in a multi-processing unit, estimating motion vectors of the macroblocks of the input image using the motion estimation on the plurality of macroblocks, previously calculated by the multi-processing unit, and encoding the image based on the motion vectors of the macroblocks.

Yet another object of the present invention is to an encoding method using motion estimation, which comprises the steps of delaying an input image and outputting the delayed image, calculating motion estimation on many macroblocks of a current frame of the input image in advance on the basis of the current frame of the input image and the delayed previous frame in a multi-processing unit, estimating motion vectors of macroblocks of the image using the motion estimation on the plurality of macroblocks, previously calculated by the multi-processing unit, and encoding the image based on the motion vectors of the macroblocks.

Technical Solution

To accomplish the objects of the present invention, an encoding system using motion estimation according to a first aspect of the present invention comprises a multi-processing unit calculating motion estimation on many macroblocks of an input image, a motion estimator estimating motion vectors of the macroblocks of the input image using the motion estimation information of the macroblocks, previously calculated by the multi-processing unit, and an encoder encoding the image based on the motion vectors of the macroblocks, estimated by the motion estimator.

The motion estimator may estimate motion vectors of many macroblocks included in frames of the image in a raster scan direction using the motion estimation information previously calculated by the multi-processing unit.

The multi-processing unit may calculate the motion estimation information at least one frame prior to a frame of the image, which is processed by the motion estimator or the encoder.

The multi-processing unit may calculate SAD values or SSD values for the motion vectors of the macroblocks.

The motion estimator may estimate the motion vectors of the macroblocks using the motion estimation information on the macroblocks, previously calculated by the multi-processing unit, on the assumption that the estimated motion vector of the previous macroblock corresponds to a predetermined fixed value.

The multi-processing unit may calculate SAD values or SSD values for the motion vectors of the macroblocks and calculates costs of the macroblocks according to the following equation based on Lagrange cost using the SAD values or SSD values and the estimated motion vector of the previous macroblock, which is assumed to be the predetermined fixed value.

$$Cost=SAD+\lambda \times (Mp-Mv) \quad [21]$$

where Cost denotes the quantity of bits required to encode a motion vector, Mv represents a candidate motion vector corresponding to a macroblock for which a motion vector will be estimated, and Mp denotes a motion vector estimated from the previous macroblock of the macroblock.

The predetermined fixed value may correspond to (0, 0).

The motion estimator may estimate a candidate motion vector corresponding to a minimum cost among costs of a macroblock, previously calculated by the multi-processing units, as a motion vector of the macroblock.

The encoding system may further comprise a motion vector storage unit storing the motion vectors of the macroblocks, estimated by the motion estimator.

To accomplish the objects of the present invention, an encoding system using motion estimation according to a second aspect of the present invention comprises a frame buffer delaying an input image and outputting the delayed image, a multi-processing unit calculating motion estimation information of macroblocks of a current frame of the input image on the basis of the current frame of the input image and a delayed previous frame from the frame buffer, a motion estimator estimating motion vectors of macroblocks of the image using the motion estimation on the plurality of macroblocks, previously calculated by the multi-processing unit, and an encoder encoding the image based on the motion vectors of the macroblocks, estimated by the motion estimator.

The motion estimator may estimate motion vectors of many macroblocks included in frames of the image in a raster scan direction using the motion estimation previously calculated by the multi-processing unit.

The multi-processing unit may calculate the motion estimation at least one frame prior to a frame of the image, which is processed by the motion estimator or the encoder.

The multi-processing unit may calculate SAD values or SSD values for the motion vectors of the plurality of macroblocks as the motion estimation on the plurality of macroblocks.

The multi-processing unit may calculate SAD values or SSD values for the motion vectors of the macroblocks and calculates costs of the macroblocks according to the following equation based on Lagrange cost using the SAD values or SSD values and an estimated motion vector of a previous macroblock, which is assumed to be a pre-determined fixed value, as the motion estimation on the plurality of macroblocks.

$$Cost=SAD+\lambda \times (Mp-Mv) \quad [31]$$

where Cost denotes the quantity of bits required to encode a motion vector, Mv represents a candidate motion vector corresponding to a macroblock for which a motion vector will be estimated, and Mp denotes a motion vector estimated from the previous macroblock of the macroblock.

The predetermined fixed value of the estimated motion vector may correspond to (0,0).

The motion estimator may estimate a candidate motion vector corresponding to a minimum cost among costs of a macroblock, previously calculated by the multi-processing units, as a motion vector of the macroblock.

To accomplish the objects of the present invention, an encoding method using motion estimation according to a third aspect of the present invention comprises the steps of calculating motion estimation on many macroblocks of an input image in advance in a multi-processing unit, estimating motion vectors of the macroblocks of the input image using the motion estimation on the plurality of macroblocks, previously calculated by the multi-processing unit, and encoding the image based on the motion vectors of the macroblocks.

The step of estimating the motion vectors of the macroblocks may estimate motion vectors of many macroblocks included in frames of the image in a raster scan direction using the motion estimation previously calculated by the multi-processing unit.

The step of calculating the motion estimation in advance may calculate the motion estimation at least one frame prior to the step of estimating the motion vectors of the step of encoding the image.

The step of calculating the motion estimation in advance may calculate SAD values or SSD values for the motion vectors of the plurality of macroblocks as the motion estimation on the plurality of macroblocks.

The step of calculating the motion estimation in advance may comprise the steps of calculating SAD values or SSD values for the motion vectors of the macroblocks and calculating costs of the macroblocks according to the following equation based on Lagrange cost using the SAD values or SSD values and an estimated motion vector of a previous macroblock, which is assumed to be a predetermined fixed value, as the motion estimation on the plurality of macroblocks.

$$Cost=SAD+\lambda \times (Mp-Mv) \quad [40]$$

where Cost denotes the quantity of bits required to encode a motion vector, Mv represents a candidate motion vector corresponding to a macroblock for which a motion vector will be estimated, and Mp denotes a motion vector estimated from the previous macroblock of the macroblock.

The predetermined fixed value of the estimated motion vector may correspond to (0,0).

The step of estimating the motion vectors of the macroblocks may estimate a candidate motion vector corresponding to a minimum cost among costs of a macroblock, previously calculated by the multi-processing units, as a motion vector of the macroblock.

To accomplish the objects of the present invention, an encoding method using motion estimation according to a fourth aspect of the present invention comprises the steps of delaying an input image and outputting the delayed image, calculating motion estimation on many macroblocks of a current frame of the input image in advance on the basis of the current frame of the input image and the delayed previous frame in a multi-processing unit, estimating motion vectors of macroblocks of the image using the motion estimation on the plurality of macroblocks, previously calculated by the multi-processing unit, and encoding the image based on the motion vectors of the macroblocks.

The step of estimating the motion vectors of the macroblocks may estimate motion vectors of many macroblocks included in frames of the image in a raster scan direction using the motion estimation previously calculated by the multi-processing unit.

The step of calculating the motion estimation in advance may calculate the motion estimation at least one frame prior to the step of estimating the motion vectors of the step of encoding the image.

The step of calculating the motion estimation in advance may calculate SAD values or SSD values for the motion vectors of the plurality of macroblocks as the motion estimation on the plurality of macroblocks.

The step of calculating the motion estimation in advance may comprise the steps of calculating SAD values or SSD values for the motion vectors of the macroblocks and calculating costs of the macroblocks according to the following equation based on Lagrange cost using the SAD values or SSD values and an estimated motion vector of a previous macroblock, which is assumed to be a predetermined fixed value, as the motion estimation on the plurality of macroblocks.

$$Cost = SAD + \lambda \times (Mp - Mv) \qquad [49]$$

where Cost denotes the quantity of bits required to encode a motion vector, Mv represents a candidate motion vector corresponding to a macroblock for which a motion vector will be estimated, and Mp denotes a motion vector estimated from the previous macroblock of the macroblock.

The predetermined fixed value of the estimated motion vector may correspond to (0,0).

The step of estimating the motion vectors of the macroblocks may estimate a candidate motion vector corresponding to a minimum cost among costs of a macroblock, previously calculated by the multi-processing units, as a motion vector of the macroblock.

Advantageous Effects

According to the encoding system using motion estimation and the encoding method using motion estimation of the present invention, the multi-processing unit capable of performing high-speed parallel processing separately from motion estimation calculates motion estimation on macroblocks, which will be used for motion estimation, in advance and the motion estimator uses the motion estimation previously calculated and stored for motion estimation, and thus an encoding time required to encode a single frame of an image can be reduced to increase the encoding speed of the encoding system.

Furthermore, according to the encoding system using motion estimation and the encoding method using motion estimation of the present invention, the multi-processing unit capable of performing high-speed parallel processing separately from motion estimation calculates motion estimation on macroblocks, which will be used for motion estimation, in advance using a previous frame of the delayed input image instead of a reconfigured previous frame and the motion estimator uses the motion estimation previously calculated and stored for motion estimation. Accordingly, an encoding time required to encode a single frame of an image can be reduced to increase the encoding speed of the encoding system.

BRIEF DESCRIPTION OF DRAWINGS

Further objects and advantages of the invention can be more fully understood from the following detailed description taken in conjunction with the accompanying drawings, in which:

FIG. 1 is a control block diagram of an encoding system using motion estimation according to a first embodiment of the present invention;

FIG. 2 is a control block diagram of an encoding system using motion estimation according to a second embodiment of the present invention;

FIG. 3 is a control block diagram of an encoding system using motion estimation according to a third embodiment of the present invention;

FIG. 4 is a control block diagram of an encoding system using motion estimation according to a fourth embodiment of the present invention;

FIG. 5 is a control flow chart of an encoding method using motion estimation according to an embodiment of the present invention;

FIG. 6 is a control flow chart of an encoding method using motion estimation according to another embodiment of the present invention;

FIG. 7 illustrates an exemplary frame processing flow according to an encoding system and method using motion estimation in accordance with an embodiment of the present invention; and FIG. 8 illustrates an exemplary frame processing flow according to an encoding system and method using motion estimation in accordance with another embodiment of the present invention.

BEST MODE FOR CARRYING OUT THE INVENTION

The multi-processor 25 corresponding to the plurality of processors calculates SAD values of all motion vectors in search regions corresponding to the macroblocks of the current frame f(n+1) of the input image on the basis of the current frame f(n+1) and a previous frame f(n) corresponding to the input image, provided by the frame buffer 80. That is, the plurality of processors corresponding to the multi-processor 25 can respectively calculate the SAD values of all the macroblocks of the current frame f(n+1) and store the SAD values in the SAD storage unit 27.

The multi-processing unit 20 may correspond to a unit including many processors that can perform high-speed processing and are arranged in parallel, such as a GPU having many processors (corresponding to the multi-processor 25) for processing 3D images. Accordingly, the multi-processing unit 20 can simultaneously calculate the SAD values of all the macroblocks of the current frame f(n+1) at a high speed.

Since the multi-processing unit 20 simultaneously calculates the SAD values for all the macroblocks of the current frame f(n+1) at a high-speed, the multi-processing unit 10 may calculate the SAD values for all the macroblocks of the current frame f(n+1) at least one frame prior to an image frame (for example, the previous frame f(n)') processed by the motion estimator 60 or the encoder 50.

The motion estimator 60 estimates motion vectors of the macroblocks of the image using the motion estimation on the plurality of macroblocks, that is, the SAD values, calculated by the multi-processing unit 20. The motion estimator 30 estimates the motion vectors of the plurality of macroblocks of the current frame f(n+1) in the raster scan direction.

That is, the motion estimator 60 repeats an operation of acquiring an SAD value with respect to a predetermined macroblock among the SAD values for all the macroblocks of the current frame f(n+1), which are calculated and stored in the SAD storage unit 27 of the multi-processing unit 20, estimating the motion vector of the predetermined macroblock, acquiring an SAD value with respect to the next macroblock in the raster scan direction and estimating the motion vector of the next macroblock to estimate the motion vectors of all the macroblocks of the current frame f(n+1).

Here, the motion estimator 60 can calculate a cost corresponding to each candidate motion vector of each macroblock according to the above-described Equation 2 based on Lagrange cost to estimate the motion vector of each macroblock. That is, the motion estimator estimates a candidate motion vector Mv corresponding to a minimum cost for each macroblock as a final motion vector Mv of each macroblock.

The multi-processing unit 20 calculates SAD values with respect to all the macroblocks of the next frame f(n+2) and store the SAD values in the SAD storage unit 27 while the motion estimator 60 estimates the motion vectors of the macroblocks of the current frame f(n+1) using the SAD values with respect to the macroblocks of the current frame f(n+1), stored in the SAD storage unit 27.

A frame processing flow in the encoding system using motion estimation according to the third embodiment of the present invention, illustrated in FIG. 3, will now be explained with reference to FIG. 7.

As illustrated in FIG. 7, when an image is inputted, the encoder 50 encodes a first frame 0 of the input image and the multi-processing unit 20 calculates SAD values with respect to all the macroblocks of a frame 1 of the input image at a high speed for a time t1 while the first frame 0 is encoded. Here, the multi-processing unit 20 calculates the SAD values with respect to all the macroblocks of the current frame 1 based on the previous frame 0 corresponding to the delayed input image without waiting for reconfiguration of the previous frame 0, and thus the multi-processing unit 20 can calculate the SAD values independently of motion estimation of the previous frame 0. That is, since the SAD values of all the macroblocks of the current frame 1 have been already calculated while the first frame 0 is encoded, the motion estimator 60 can estimate motion vectors of the macroblocks of the current frame 1 using the previously calculated SAD values of the macroblocks of the current frame 1 without calculating the SAD values and the encoder 50 can encode the current frame 1 for an encoding time t2.

In the encoding system using motion estimation according to the third embodiment of the present invention, the multi-processing unit 20 calculates motion estimation (SAD or SSD) to be used for motion estimation in advance on the basis of the previous frame f(n) corresponding to the delayed input image instead of the previous frame f(n)' reconfigured in the aforementioned encoding system using motion estimation according to the first embodiment of the present invention, and thus the multi-processing unit 20 can calculate the motion estimation (SAD or SSD) more rapidly without waiting for encoding of the previous frame f(n)' according to the encoder 50 and reconfiguration of the previous frame f(n)' and provide the motion estimation to the motion estimator 60. Accordingly, the encoding system using motion estimation according to the third embodiment of the present invention can remarkably shorten the time required to encode a single frame of the image from the conventional encoding time t to t2. That is, the encoding system using motion estimation according to the third embodiment of the present invention can achieve high-speed motion estimation to further increase the encoding speed.

An encoding system using motion estimation according to a fourth embodiment of the present invention will now be explained with reference to FIG. 4.

Referring to FIG. 4, the encoding system using motion estimation according to the fourth embodiment of the present invention includes a frame buffer 80 delaying an input image and outputting the delayed image, a multi-processing unit 20' for calculating motion estimation on many macroblocks of a current frame of the input image based on the current frame of the input image and a previous frame delayed by the frame buffer 80, a motion estimator 60' for estimating motion vectors of many macroblocks of the image using the motion estimation on the plurality of macroblocks of the current frame, calculated by the multi-processing unit 20' in advance, and an encoder 50 for encoding the image based on the motion vectors of the macroblocks, estimated by the motion estimator 60'.

The encoder 50 illustrated in FIG. 4 is identical to the encoder 50 illustrated in FIG. 1 and the frame buffer 80 illustrated in FIG. 4 is identical to the frame buffer illustrated in FIG. 3 so that explanations thereof are omitted.

The multi-processing unit 20' calculates the motion estimation on the plurality of macroblocks of the input image. Here, the motion estimation may correspond to costs of the macroblocks, obtained according to the above-described Equation 2 using SAD values or SSD values of motion vectors of many macroblocks of a current frame of the input image, which are calculated by the multi-processing unit 20', and an estimated motion vector of a previous macroblock, which is assumed to be a predetermined fixed value.

That is, multiple processors (referred to as a multi-processor 25' hereinafter) of the multi-processing unit 20' calculate SAD values with respect to all motion vectors in search regions respectively corresponding to all the macroblocks of the current frame f(n+1) of the input image on the basis of the current frame f(n+1) of the input image and a previous frame f(n) corresponding to the input image, provided by the frame buffer 80, and store the SAD values in an SAD storage unit 27'.

The multi-processor 25' calculates a cost corresponding to each candidate motion vector of each macroblock of the current frame f(n+1) according to Equation 2 based on Lagrange cost using the SAD values with respect to all the macroblocks of the current frame f(n+1), stored in the SAD storage unit 27'. Here, the estimated motion vector Mp in Equation 2 is assumed to be the predetermined fixed value. If the estimated motion vector Mp is assumed to be the predetermined fixed value and the motion vector of the previous macroblock is not considered, a waiting time for estimation of the emotion vector of the previous macroblock can be reduced and the multi-processor 25' can calculate the cost corresponding to each candidate motion vector of each macroblock.

The predetermined fixed value of the estimated motion vector Mp may be (0,0). It will be understood by those skilled in the art that (0,0) is a most suitable fixed value determined in consideration of the fact that a motion vector estimated from a previous macroblock approximates (0,0) in most cases.

The multiple processors of the multi-processor 25' can respectively calculate costs corresponding to candidate motion vectors of the macroblocks of the current frame f(n+1) and store the costs in the SAD storage unit 27'.

Here, the multi-processing unit 20' may be a user including many processors that are arranged in parallel and can perform high-speed processing, such as a GPU having multiple processors (corresponding to the multi-processor 25') for processing 3D images. The multi-processing unit 20' can simultaneously process the SAD values and the costs with respect to all the macroblocks of the current frame f(n+1) at a high speed.

Here, since the multi-processing unit 20' calculates the SAD values and the costs with respect to all the macroblocks of the current frame f(n+1), the multi-processing unit 20' may calculate the SAD values and the costs for all the macroblocks of the current frame f(n+1) at least one frame prior to an image frame (for example, the previous frame f(n)') processed by the motion estimator 60' and the encoder 50.

The motion estimator 60' estimates a candidate motion vector Mv corresponding to a minimum cost among the costs with respect to all the candidate motion vectors corresponding to the plurality of macroblocks, previously calculated by the multi-processing unit 20', as a final motion vector of the corresponding macroblock and stores final motion vectors Mv of the macroblocks in the motion vector storage unit 80. That is, the motion estimator 60' uses the costs of all the candidate motion vectors corresponding to the plurality of macroblocks of the current frame f(n+1), stored in the SAD storage unit 27' of the multi-processing unit 20', instead of calculating the costs to estimate a candidate motion vector corresponding to the minimum cost for each macroblock as the final motion vector of each macroblock. This further decreases the encoding time t2 in the frame processing flow illustrated in FIG. 7.

The motion vector storage unit 80 stores the final motion vectors Mv of the macroblocks, estimated by the motion estimator 60'.

The encoder 50 encodes the image based on the motion vectors of the macroblocks, stored in the motion vector storage unit 80, as described above with reference to FIG. 1.

The multi-processing unit 20' calculates SAD values and costs with respect to all the macroblocks of the next frame f(n+2) and stores the SAD values and the costs in the SAD storage unit 27' while the motion estimator 60' estimates the motion vectors of the macroblocks of the current frame f(n+1) using the costs of the macroblocks, which are stored in the SAD storage unit 27'.

In the encoding system using motion estimation according to the fourth embodiment of the present invention, the multi-processing unit 20' calculates SAD or SSD values to be used for motion estimation in advance on the basis of the previous frame f(n) corresponding to the delayed input image instead of the previous frame f(n)' reconfigured in the aforementioned encoding system using motion estimation according to the second embodiment of the present invention. Furthermore, the multi-processing unit 20' calculates motion estimation (costs corresponding to candidate motion vectors of macroblocks) in advance according to the Lagrange cost based Equation 2 in which the estimated motion vector Mp has a fixed value. Accordingly, the multi-processing unit 20*s* can calculate the motion estimation (costs corresponding to candidate motion vectors of macroblocks) more rapidly without waiting for encoding of the previous frame f(n)' according to the encoder 50 and reconfiguration of the previous frame f(n)' and provide the motion estimation to the motion estimator 60'. Therefore, the encoding system using motion estimation according to the fourth embodiment of the present invention can remarkably shorten the time required to encode a single frame of the image from the conventional encoding time t to t2 and decrease even the encoding time t2. That is, the encoding system using motion estimation according to the fourth embodiment of the present invention can achieve high-speed motion estimation to further increase the encoding speed.

A control flow of an encoding method using motion estimation according to a first embodiment of the present invention, which corresponds to the aforementioned encoding systems according to the first, second, third and fourth embodiments of the present invention, will now be explained with reference to FIG. 5. The encoding method is described with reference to the configuration illustrated in FIG. 1 for convenience of explanation.

The multi-processing unit 10 calculates motion estimation on many macroblocks of an input image in step S10. Here, the motion estimation calculated by the multi-processing unit 10 may correspond to SAD values or SSD values with respect to motion vectors of many macroblocks of a current frame of the input image. A case that the multi-processing unit 10 calculates SAD values is explained. That is, the multi-processing unit 10 calculates SAD values for motion vectors in search regions corresponding to all the macroblocks of the current frame f(n+1) of the input image on the basis of the current frame f(n+1) of the input image and a reconfigured previous frame f(n)' provided by the frame storage unit 90 in step S10.

The motion estimator 30 estimates motion vectors of the macroblocks of the current frame f(n+1) in the raster scan direction using the motion estimation on the plurality of macroblocks, calculated by the multi-processing unit 10, that is, the SAD values, in steps S20 through S60.

Specifically, the motion estimator 30 designates a to-be-processed macroblock of the current frame f(n+1) as a first block in the raster scan direction in step S20. The motion estimator 30 acquires the SAD value corresponding to the to-be-processed macroblock from the SAD values with respect to all the macroblocks of the current frame f(n+1), previously calculated and stored in the multi-processing unit 10, and calculates costs corresponding to candidate motion vectors of the to-be-processed macroblock according to the following Equation 2 based on Lagrange cost in step S30. Then, the motion estimator 30 estimates a candidate motion vector Mv corresponding to a minimum cost among the costs corresponding to the candidate motion vectors of the macroblock as a final motion vector Mv of the to-be-processed macroblock in step S40 and provides the final motion vector Mv of the macroblock to the encoder 50.

[Equation 2]

$$\text{Cost} = \text{SAD} + \lambda \times (Mp - Mv) \qquad [95]$$

The motion estimator 30 determines whether the processed macroblock corresponds to the last macroblock of the current frame f(n+1) in step S50, designates the next macroblock in the raster scan direction when it is determined that the processed macroblock is not the last macroblock in step S60, and executes step S30 on the next macroblock.

The multi-processing unit 10 executes step S10 on the next frame f(n+1) while the motion estimator 30 carries out steps S20 through S60. Here, the multi-processing unit 10 may perform step S10 at least one frame prior to the operation of the motion estimator 30 to perform the steps S20 through S60.

When it is determined that the processed macroblock corresponds to the last macroblock of the current frame f(n+1) in step S50, motion estimation for the current frame f(n+1) is finished. Of course, motion estimation for the next frame f(n+1) is performed according to the above-described control flow.

The encoding method using motion estimation according to the first embodiment of the present invention can calculate motion estimation (SAD values or SSD values) to be used for motion estimation in advance through the multi-processing unit capable of performing high-speed parallel processing and perform motion estimation according to the motion estimator using the motion estimation (SAD values or SSD values) of macroblocks, previously calculated and stored, to remarkably reduce the encoding time t' required to encode a single frame of the image as compared to the encoding time t of the conventional encoding system. That is, the encoding method using motion estimation according to the first embodiment of the present invention can achieve high-speed motion estimation to improve the encoding speed.

An encoding method using motion estimation corresponding to the encoding system according to the third embodiment of the present invention can be explained with reference to FIG. 5.

The encoding method further includes a step (not shown) of delaying the input image frame by frame before step S10. The multi-processing unit 10 calculates SAD values for motion vectors in search regions corresponding to all the macroblocks of the current frame f(n+1) of the input image on the basis of the current frame f(n+1) of the input image and the previous frame f(n) corresponding to the delayed image in step S10.

Accordingly, the encoding method using motion estimation can execute step S10 of calculating the motion estimation (SAD values or SSD values) of the macroblocks of the current frame f(n+1) more rapidly without having a time consumed for the encoder to encode the previous frame f(n)' and to reconfigure the previous frame and provide the motion estimation to the motion estimator. Furthermore, the encoding method using motion estimation corresponding to the encoding system according to the third embodiment of the present invention can make the encoding time t2 required to encode a single frame of the image shorter than the encoding time t of the conventional encoding system and even than the encoding time t' of the encoding system according to the first embodiment of the present invention, as illustrated in FIG. 8.

An encoding method using motion estimation corresponding to the encoding system according to the second embodiment of the present invention will now be explained with reference to FIGS. 2 and 6.

The multi-processing unit 10' calculates motion estimation on many macroblocks of an input image in steps S110 and S120. Here, the motion estimation may correspond to costs of many macroblocks of a current frame of the input image, which are obtained according to the aforementioned equation 2 using SAD values or SSD values (the multi-processing unit 10' calculates SAD values in the current embodiment of the present invention) with respect to motion vectors of the macroblocks of the current frame and an estimated motion vector of a previous macroblock, which is assumed to be a fixed value.

That is, the multi-processing unit 10' calculates SAD values or SSD values (the multi-processing unit 10' calculates SAD values in the current embodiment of the present invention) for motion vectors in search regions corresponding to all the macroblocks of the current frame f(n+1) of the input image on the basis of the current frame f(n+1) and a reconfigured previous frame f(n)' provided by the frame storage unit 90 in step S110. The multi-processing unit 10' calculates costs corresponding to candidate motion vectors of each macroblock according to the aforementioned Equation 2 based on Lagrange cost using the previously calculated SAD values of the macroblocks in step S120. Here, the costs may be calculated on the assumption that the estimated motion vector Mp in Equation 2 corresponds to a predetermined fixed value (0,0). If the estimated motion vector Mp is assumed to be the predetermined fixed value and the motion vector of the previous macroblock is not considered, a waiting time for estimation of the motion vector of the previous macroblock can be shortened and the multi-processing unit 10' can calculate the costs corresponding to the candidate motion vectors of each macroblock at a high speed/in parallel.

The motion estimator 30' estimates motion vectors of the plurality of macroblocks in the raster scan direction using the motion estimation on the plurality of macroblocks, that is, the costs, in steps S130, S140, S150 and S160.

More specifically, the motion estimator 30' designates a to-be-processed macroblock of the current frame f(n+1) as a first block in the raster scan direction in step S130. The motion estimator 30' acquires the cost corresponding to the to-be-processed macroblock from the costs of all the macroblocks of the current frame f(n+1), previously calculated and stored in the multi-processing unit 10', and estimates the candidate motion vector Mv corresponding to a minimum cost among costs of candidate motion vectors of the to-be-processed macroblock as a final motion vector Mv of the to-be-processed macroblock in step S140. Then, the motion estimator 30' provides the final motion vector Mv of the macroblock to the encoder 50.

The motion estimator 30' determines whether the processed macroblock corresponds to the last macroblock of the current frame f(n+1) in step S150, designates the next macroblock in the raster scan direction when it is determined that the processed macroblock does not correspond to the last macroblock of the current frame f(n+1) in step S160 and executes step S140 on the next macroblock.

The multi-processing unit 10' executes steps S110 and S120 while the motion estimator 30' performs steps S130, S140, S150 and S160. Here, the multi-processing unit 10' may perform steps S110 and S120 on the next frame f(n+2) at least one frame prior to the operation of the motion estimator 30' to perform steps S130, S140, S150 and S160.

When it is determined that the processed macroblock corresponds to the last macroblock of the current frame f(n+1) in step S150, motion estimation for the current frame f(n+1) is finished and motion estimation for the next frame f(n+1) is performed according to the above-described control flow.

The encoding method using motion estimation according to the second embodiment of the present invention can calculate SAD values or SSD values to be used for motion estimation in advance through the multi-processing unit capable of performing high-speed parallel processing, calculate motion estimation (costs corresponding to candidate motion vectors of macroblocks) in advance according to Equation 2 based on Lagrange cost having a fixed value as the estimated motion vector Mp and use the costs corresponding to the candidate motion vectors of the macroblocks, previously calculated and stored, for motion estimation according to the motion estimator to reduce the encoding time t' required to encode a single frame of the image such that the encoding time t' becomes shorter than the encoding time t of the conventional encoding system and even than the encoding time of the encoding system according to the first embodiment of the present invention.

An encoding method using motion estimation corresponding to the encoding system according to the fourth embodiment of the present invention can be explained with reference to FIG. 6.

The encoding method further includes a step (not shown) of delaying the input image frame by frame before step S110. The multi-processing unit 20' calculates SAD values for motion vectors in search regions corresponding to all the macroblocks of the current frame f(n+1) of the input image on the basis of the current frame f(n+1) of the input image and a previous frame f(n) corresponding to the delayed image in step S110. The multi-processing unit 20' calculates costs corresponding to candidate motion vectors of each macroblock according to the above-described Equation 2 based on Lagrange cost using the previously calculated SAD values corresponding to the macroblocks of the current frame f(n+1) in step S120.

Accordingly, the encoding method using motion estimation can execute step S110 of calculating the motion estimation (SAD values or SSD values) of the macroblocks of the current frame f(n+1) more rapidly without having a time consumed for the encoder to encode the previous frame f(n)' and to reconfigure the previous frame. Furthermore, the encoding method using motion estimation corresponding to the encoding system according to the fourth embodiment of the present invention can reduce the encoding time t2 required to encode a single frame of the image such that the encoding time t2 becomes shorter than the encoding time t of the conventional encoding system and even than the encoding time of the encoding system according to the third embodiment of the present invention, as illustrated in FIG. 8.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the encoding system and encoding method using motion estimation which can calculate motion estimation to be used for motion estimation in advance through a multi-processing unit capable of performing high-speed parallel processing separately from motion estimation and perform motion estimation using motion estimation on macroblocks, previously calculated and stored, through a motion estimator to reduce a time required to encode a single frame of an image and improve an encoding speed, a motion estimation speed and an encoding speed can be increased and an image providing speed and throughput can be remarkably enhanced. Furthermore, an encoder applied to the encoding system has sufficient sale potential.

The invention claimed is:

1. An encoding apparatus using motion estimation, the encoding apparatus comprising:
   one or more processors configured to
   for each image block included in an image unit, obtain information on candidate motion vectors relating to each image block;
   determine a motion vector relating to each image block based on the information on candidate motion vectors for each image block;
   generate a prediction signal relating to each image block by performing an inter prediction based on the determined motion vector; and
   perform a transform and a quantization on a residual signal of each image block, the residual signal being a difference between an original signal relating to each image block and the prediction signal,
   wherein the image unit comprises a plurality of image blocks, the information on candidate motion vectors for each image block generated without referencing other image blocks included in the image unit,
   wherein the information on candidate motion vectors for each image block is generated by referencing at least an image block in another image unit,
   wherein both the image unit and the another image unit are at different positions within the same time frame, and
   wherein when the candidate motion vectors for one image block include a fixed value, candidate motion vectors of other image blocks included in the image unit also include an identical value as the fixed value.

2. The encoding apparatus of claim 1, wherein the motion prediction information includes at least one of SAD values with respect to each image block and costs corresponding to the candidate motion vectors.

3. The encoding apparatus of claim 1, wherein the one or more processors are configured to determine motion vectors relating tothe plurality of the image blocks in the image unit sequentially in raster scan direction.

4. A decoding apparatus using motion compensation, the decoding apparatus comprising:
   one or more processors configured to
   for each image block in an image unit, obtain information on candidate motion vectors relating to each image block;
   derive a motion vector relating to each image block based on the information on candidate motion vectors for each image block;
   generate a prediction signal relating to each image block by performing an inter prediction based on the determined motion vector; and
   perform an inverse-quantization and an inverse-transform on a residual signal relating to each image block,
   wherein the image unit comprises a plurality of image blocks, the information on candidate motion vectors for each image block generated without referencing other image blocks included in the image unit,
   wherein the information on candidate motion vectors for each image block is generated by referencing at least an image block in another image unit,
   wherein both the image unit and the another image unit are at different positions within the same time frame, and
   wherein when the candidate motion vectors for one image block include a fixed value, candidate motion vectors of other image blocks included in the image unit also include an identical value as the fixed value.

5. The decoding apparatus of claim 4, wherein the motion prediction information includes at least one of SAD values with respect to each image block and costs corresponding to the candidate motion vectors.

6. The decoding apparatus of claim 4, wherein the one or more processors are configured to derive motion vectors relating to the plurality of the image blocks in the image unit sequentially in raster scan direction.

* * * * *